Oct. 26, 1965   G. R. DEMPSTER ETAL   3,214,045
CONTAINER LOADING AND UNLOADING MECHANISM
Filed Sept. 22, 1960
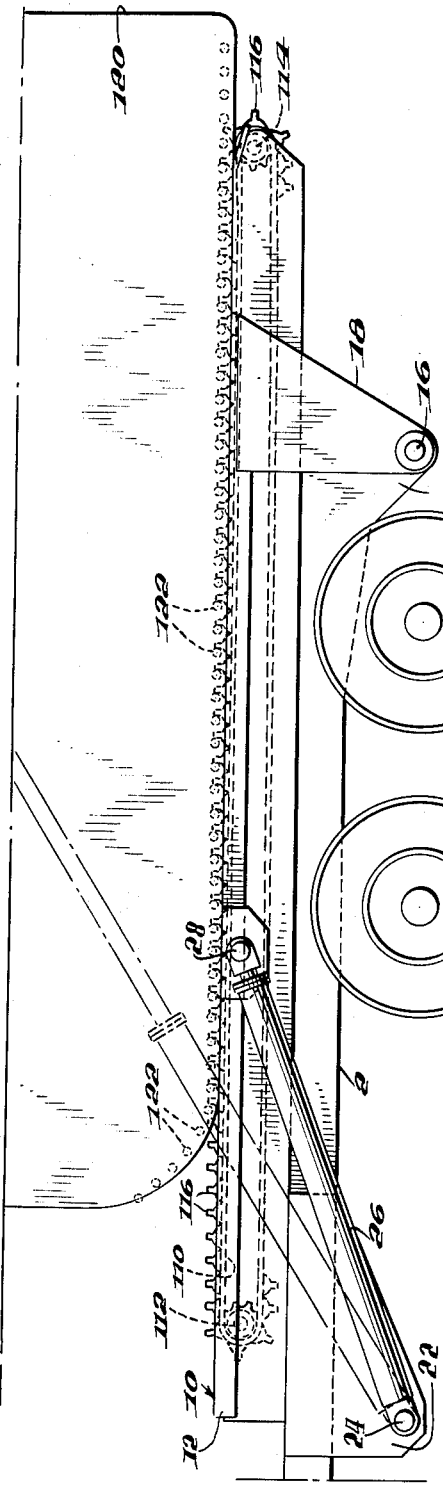
INVENTORS
GEORGE R. DEMPSTER,
WILLIAM A. HERPICH,
CHARLES R. COOLEY,
BY
ATTORNEY { # United States Patent Office

3,214,045
Patented Oct. 26, 1965

3,214,045
CONTAINER LOADING AND UNLOADING MECHANISM
George R. Dempster, Knoxville, Tenn.; Trust Company of Georgia, executor of said George R. Dempster, deceased, and Charles R. Cooley, Knoxville, Tenn., and William A. Herpich, Galion, Ohio; said Cooley and said Herpich assignors to Dempster Brothers, Inc., Knoxville, Tenn., a corporation of Tennessee
Filed Sept. 22, 1960, Ser. No. 57,732
3 Claims. (Cl. 214—505)

This invention is related to improvements in container loading and unloading mechanism whereby large-sized containers may be loaded and unloaded with respect to a transport vehicle that is separable therefrom.

It is often desirable to use large capacity containers for holding various types of lading and to provide for the picking up and unloading of the containers with respect to a vehicle so that the containers may be transported. Such a container may be filled when resting on the ground or other surface, after which it may be picked up by a vehicle and transported to a distant point where it can be loaded from the vehicle or the contents discharged therefrom. If the container remains on the vehicle, it may be returned to the location of filling or to a new location and placed on the ground again for refilling.

Previous types of mechanism for picking up and unloading large containers from vehicles have used cable-type hoisting devices, but these have not been entirely satisfactory. The undesirable features of apparatus employing cables include the fact that cables not infrequently break and therefore the use of cables can be hazardous. Also, the use of cables does not afford the desirable control over the movement of the containers.

Certain other types of container loading mechanism accomplish this operation without the use of cables. Such mechanism instead uses hydraulically powered apparatus that is capable of handling containers which are usually the size of a normal truck body. This hydraulically powered apparatus employs a cylinder and piston device for pulling the container onto the vehicle and for removing the container from the vehicle. Although this apparatus has proved to be satisfactory in the past, it has been found that an improvement resides in the use of hydraulically powered apparatus whereby the container is moved onto or off of the vehicle by means of a chain driven mechanism which provides a continuous motion.

One object of this invention is to improve the construction of equipment for handling a detachable body or container for the loading and unloading of the same with respect to a vehicle chassis.

Another object of this invention is to provide apparatus for loading or for unloading a large-sized container with respect to the chassis of a vehicle wherein a safe and positive connection is established between the separable container and the apparatus.

In one embodiment of this invention an endless-type chain is provided which extends along the length of the tilting frame. Spaced apart along the length of the chain there are a number of protruding lug members. The container is provided at the bottom thereof with a series of cross bars which are spaced apart along the length of the container and adapted to be engaged by the lug members on the endless chain. Suitable hydraulically operated power apparatus is provided for driving the chain in either direction for moving the container onto or off of the tilting frame.

This embodiment of the invention is illustrated in the accompanying drawings in which:

FIG. 1 is a side elevation view showing container loading and unloading mechanism and a separable container positioned on the transport vehicle; and FIG. 2 is an enlarged fragmentary side elevation view of a separable container and portions of the loading and unloading apparatus shown in FIG. 1.

The invention is illustrated as applied to a motor vehicle chassis of conventional form wherein the chassis frame indicated generally at 2 is supported by a front wheel and axle assembly and by rear wheel and axle assemblies 6. The vehicle is power driven in the usual manner under control of an operator.

The chassis frame should be of sufficient length to receive thereon a large size container of the order of a vehicle body. If desired the chassis frame may be that of a conventional trailer separated from the tractor portion of the vehicle although functioning otherwise in the same manner as described.

Mounted on the chassis frame 2 is a tilting frame generally indicated at 10 in such position as to be disposed directly over the chassis frame 2. The tilting frame 10 extends lengthwise of the chassis 2 and includes a pair of longitudinal channels or side members 12 (FIG. 1) on opposite sides of the tilting frame in vertical alignment with sides of the chassis 2. The channels 12 are suitably braced and spaced apart by intermediate connecting members which cooperate to form a unitary structure. The top surfaces of the channels 12 are suitably strong and unobstructed so that a container may slide therealong during its movement onto or off of the vehicle.

At the rear end of the chassis frame 2, at each lateral side thereof, is a depending bracket 14. Supported upon the brackets 14 is a pivot shaft 16 which pivotally supports a pair of brackets 18 which are connected rigidly with the rear end portion of the tilting frame 10. In this manner, the tilting frame 10 is pivotally mounted on the rear of the chassis 2 for swinging movement relative thereto as illustrated in FIGS. 1 and 2.

At the forward end portion of the tilting frame 10 the chassis 2 is provided with depending brackets 22 welded or otherwise secured rigidly to the members of the chassis frame. The brackets 22 support for pivotal movement a shaft 24 which extends transversely of the vehicle.

Mounted on the outer projecting ends of the shaft 24 are the lower ends of hydraulic power devices or cylinders 26, the upper ends of which are pivotally connected at 28 with opposite sides of the tilting frame 10. The hydraulic power devices 26 are of any suitable or desired form with a cylinder and piston assembly for each capable of telescoping movement in raising and lowering the tilting frame 10 relative to the chassis frame 2. For example, the tilting frame 10 can be raised by the power devices 26 to the position shown in FIG. 2, and from this position, moved to the lowered position shown in FIG. 1.

The channel members 12 of the tilting frame 10 form a skidway for receiving thereon a detachable container 120.

The container 120 may be filled, if desired, separate and apart from the vehicle chassis while sitting on the ground or some other supporting surface. After the container has been filled, it may be loaded on to the vehicle and transported to a remote point where the contents of the container may be removed. The container may then be brought back to the same place or to a different place for refilling. Any type of lading that is suitable for the container may be handled.

This embodiment of the invention as shown in FIGS. 1 and 2, employs an endless flexible chain member 110 which is supported at the front of the tilting frame 10 by a front drive sprocket 112 and at the rear of the tilting frame by a sprocket 114. Attached to the outside of the chain at spaced-apart intervals are a number of lug members 116 having projections which extend away from the chain.

As shown in FIGS. 1 and 2, the sprockets 112 and 114 are positioned on the tilting frame 10 in such a manner that the lug members 116 extend beyond the limits of the tilting frame 10 upwardly and to the rear.

The drive sprocket 112 at the front of the tilting frame 10 may have suitable power mechanism connected therewith for driving the chain 110.

The container 120 used in connection with this type of chain and lug arrangement is provided throughout its length with a series of cross bars 122 extending transversely of the container 120 and spaced apart throughout the length of the container a distance which corresponds with the spacing between the lugs 116.

When the container 120 is on the ground or other supporting surface, the tilting frame 10 may be raised by the power devices 26, and the vehicle may be manipulated to bring the lugs 116 into engagement with the cross bars 122 of the container as shown in FIG. 2. Then, the chain 110 may be actuated to pull the container 120 onto the tilting frame 10 in a continuous motion. As the container 120 is being pulled in this manner onto the tilting frame 10, the tilting frame may be lowered onto the vehicle chassis 2. Operation of the chain 110 may be continued until the container 120 has been pulled all the way onto the tilting frame 10. The container 120 will then be in proper position on the vehicle to be transported to a new location.

The unloading of the container 120 from the vehicle is accomplished by reversing the direction of travel of the chain 110. The angle of elevation of the tilting frame 10 may be adjusted by proper manipulation of the power devices 26 in order to facilitate the unloading of the container.

It will be apparent that the mechanism described is quite versatile in loading large size containers onto a vehicle. With this mechanism, control over movement of the container is maintained throughout a loading or unloading operation. The use of cables, which has been employed in the past, is completely eliminated. The loading and unloading operations of the container may be carried out by the operator without the need for him to leave the cab of the vehicle.

While the invention has been illustrated and described in one embodiment, it is recognized that variations and changes made be made therein, without departing from the invention as set forth in the claims.

We claim:

1. In transporting equipment of the character described, the combination with a motor vehicle chassis, of a tilting frame, means mounting an intermediate portion of the tilting frame for swinging movement relative to the chassis to raised and lowered positions with respect thereto and for holding said frame against bodily displacement with respect to the chassis, power means operatively connected with the tilting frame for raising and lowering said frame, and an endless flexible device mounted on the tilting frame for rectilinear movement relative thereto and having means fixed thereto and spaced-apart therealong for detachable connection with a container for moving the container onto or off the tilting frame.

2. In a transporting equipment of the character described, the combination with a motor vehicle including a chassis frame, of a tilting frame overlying the chassis frame, means mounting an intermediate portion the tilting frame for swinging movement with respect to the chassis frame about an axis located appreciably below the chassis frame and holding said frame against bodily displacement relative to the chassis frame, power means operatively connected with the tilting frame for raising and lowering the forward portion of said frame, and an endless flexible device mounted on the tilting frame for rectilinear movement relative thereto and having means fixed thereto and spaced-apart therealong for detachable connection with a container for moving the container onto or off the tilting frame.

3. In a transporting equipment of the character described, the combination with a motor vehicle including a chassis frame, of a tilting frame overlying the chassis frame, means mounting an intermediate portion of the tilting frame for swinging movement with respect to the chassis frame about an axis located appreciably below the chassis frame and holding said frame against bodily displacement relative to the chassis frame, power means operatively connected with the chassis and the tilting frame forwardly of said mounting means for raising and lowering said frame, and an endless flexible device mounted on the tilting frame for rectilinear movement relative thereto, a container slidably mounted on the tilting frame, and means connected with and spaced-apart along the flexible device and extending above the tilting frame for detachably engaging the container to move the container onto or off the tilting frame.

References Cited by the Examiner

UNITED STATES PATENTS

| | | | |
|---|---|---|---|
| 1,821,327 | 9/31 | Scott | 214—38.22 |
| 1,910,398 | 5/33 | Ludington | 214—38 X |
| 2,266,791 | 12/41 | Norbom | 214—516 |
| 2,516,881 | 8/50 | Jarvis | 214—516 |
| 2,521,727 | 9/50 | Kappen | 214—518 |
| 2,613,827 | 10/52 | Van Doorne | 214—83.3 X |
| 2,741,383 | 4/56 | Leckert | 214—505 |
| 2,867,339 | 1/59 | Nelson | 214—504 |
| 2,902,180 | 9/59 | Smith | 214—82 |
| 2,916,169 | 12/59 | De Witt | 214—83.36 |

FOREIGN PATENTS 849,376   7/49   Germany.

HUGO O. SCHULZ, *Primary Examiner.*

ERNEST A. FALLER, *Examiner.*